Jan. 12, 1965        H. ETTISCHER ETAL        3,165,038
COMPENSATING DEVICE FOR PHOTOGRAPHIC CAMERAS
Filed Oct. 23, 1962                           2 Sheets-Sheet 1

HELMUT ETTISCHER
PAUL HARTER
INVENTOR.

BY *R. Frank Smith*
*Robert W. Hampton*
ATTORNEYS

Jan. 12, 1965  H. ETTISCHER ETAL  3,165,038
COMPENSATING DEVICE FOR PHOTOGRAPHIC CAMERAS
Filed Oct. 23, 1962  2 Sheets-Sheet 2

HELMUT ETTISCHER
PAUL HARTER
INVENTOR.

BY
ATTORNEYS

United States Patent Office 3,165,038
Patented Jan. 12, 1965

3,165,038
COMPENSATING DEVICE FOR PHOTOGRAPHIC CAMERAS
Helmut Ettischer and Paul Harter, Ruit, Esslingen, Germany, assignors to Eastman Kodak Company, Rochester, N.Y., a corporation of New Jersey
Filed Oct. 23, 1962, Ser. No. 232,440
3 Claims. (Cl. 95—10)

The present invention concerns photographic cameras having interchangeable taking lenses, and more particularly relates to compensating photoelectric exposure control systems in such cameras for the substitution of one such lens for another.

Cameras with interchangeable lenses of various maximum apertures are well known, in which the diaphragm and/or shutter time adjustment is coupled with an exposure meter. The different maximum apertures of the interchangeable lenses are compensated for, quite commonly, by coupling the exposure meter with the lens diaphragm by adaptor cams, such that when a lens is attached to the camera the meter is set to a value corresponding to the maximum aperture of that lens. Alternatively, when a lens is attached to the camera the exposure control system may be compensated, for example by adjusting a mask in front of the photocell. These arrangements have the defect of being relatively complex and expensive.

An object of the invention is to provide a simple, inexpensive means to compensate for the attachment of various interchangeable lenses to a camera having a photoelectric exposure control system wherein a scanning member senses the position of the meter pointer and is coupled to the diaphragm and/or shutter adjusting members for regulating exposure. The object is achieved, according to the invention, by adjusting the position of the scanning member.

Other objects of the invention will appear from the following description, reference being made to the accompanying drawings, wherein.

Figure 1:
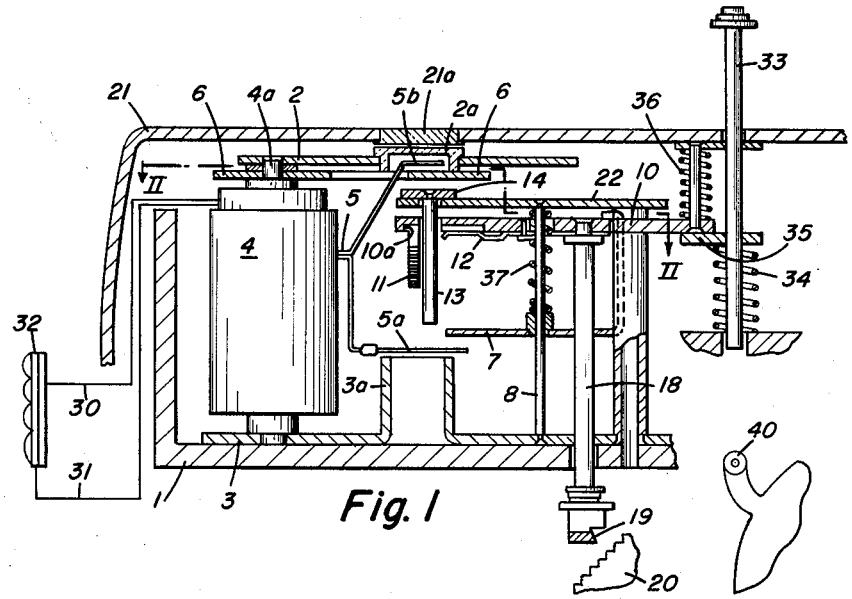
FIG. 1 is a sectional side view of the exposure control elements of a camera embodying one form of the invention.

Referring to the drawings, a frame member 1 for the exposure control device supports a base plate 3, which in turn pivotally supports a measuring instrument 4 at one end. The other end of the instrument is pivotally supported, on an axle 4a by a plate 2. The measuring instrument is connected by leads 30 and 31 to a photocell 32, which is adapted for illumination by field light and energizes the instrument as a function of field brightness. A double indicator 5 of the instrument 4 is deflected as a function of field brightness. A lower indicator arm 5a moves in a range overlying an anvil 3a formed from base plate 3, while an upper indicator arm 5b moves in the range of a diaphragm scale 6a carried by a scale plate 6, which is pivotally mounted on the axle 4a of instrument 4. Indicator arm 5b can be viewed through a window 2a in plate 2 and a window 21a in a cover member 21.

A pointer clamping member 7 and a support plate 10 are mounted for vertical sliding movement along a pair of support pins 8 and 9 in response to movement of a camera actuating member 33. Pins 8 and 9 are supported by the base plate 3 and another fixed plate 22. A first scanning or sensing member comprising a stepped plate 11 is guided for lateral sliding movement in an arcuate slot 10a of support plate 10 and is held in that slot by a leaf spring 12.

Manual depression of the actuating member 33 overcomes the tension of a first spring 34 and carries an arm 35 downward with member 33. This permits a second spring 36 to drive plate 10 downward, while a third spring 37 drives the clamping member 7 downward. Member 7 clamps indicator arm 5a in its current position representing field brightness. Scanning member 11 then engages arm 5a to limit the downward movement of support plate 10 at a position also representing field brightness. Upon further downward movement of the camera actuating member 33, it engages a shutter tripping member 40 for operating the shutter to take a picture.

The scanning member 11 is moved along slot 10a by means of a pin 13 that is supported by a slide plate 14, which in turn is supported on the upper surface of plate 22. A pin 15a engages a slot 14a in slide plate 14 and is secured to a lever 15, which is pivotally mounted on a lateral extension 1a of the frame member 1.

Figure 2:
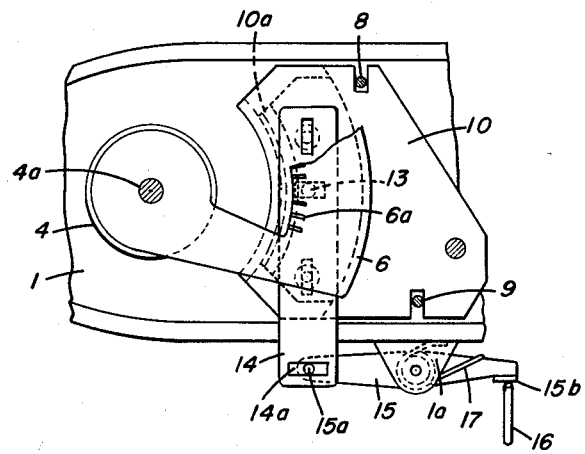
FIG. 2 is a top view of the mechanism shown in FIG. 1, along the line II—II.
Figure 4:
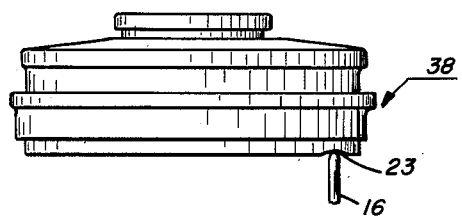
FIG. 4 is a side view of a typical interchangeable lens unit.

An ear 15b on lever 15 cooperates with a control pin 16, which senses a notch or other surface irregularity 23 (FIG. 4) in each interchangeable lens assembly or unit. One such unit is illustrated at 38 in FIG. 4. In each lens assembly the depth of notch 23 represents the maximum aperture of the lens in that assembly. A spring 17 (FIG. 2) maintains lever 15 in contact with control pin 16 and maintains the control pin in contact with the lens assembly 38 (FIG. 4).

Plate 10 carries a bolt 18 having a sensing surface 19 with which a second scanning member, comprising a stepped plate 20 cooperates. Member 20 senses the vertical position of surface 19 and is coupled to the diaphragm and/or exposure time adjusting members, in a well known manner, for regulating camera exposure as a function of the vertical travel of bolt 18, and therefore as a function of field brightness.

The mode of operation is as follows:

With the installation of a lens, the control pin 16 is positioned by the control surface 23 of the lens unit, and thereby positions lever 15, pin 13, slide member 14 and the first scanning member 11 in accordance with the maximum aperture of the attached lens.

Figure 3:
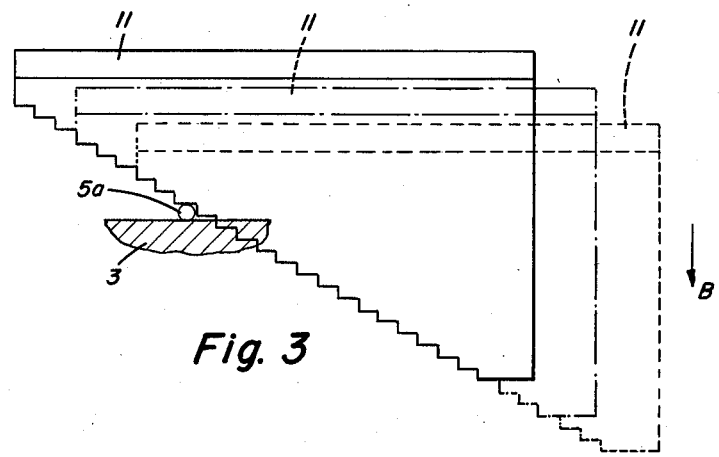
FIG. 3 illustrates the position of the scanning member for various lenses having different maximum apertures.

Referring to FIG. 3, and assuming that during the process of changing lenses no change in field brightness occurred, the lower indicator arm 5a of instrument 4 is, for example, in a position which corresponds to an exposure aperture of $f/4$. The stepped plate 11 is brought into the lateral position depicted in full lines by a lens having a maximum aperture of $f/1.9$. Each full diaphragm stop is represented by three steps on plate 11. Accordingly, with a change to a lens having a maximum aperture of $f/2.8$ plate 11 is moved three steps to the right (shown by the lefthand broken outline of that plate). With a further change to a lens having a maximum aperture of $f/4$, plate 11 is moved another three steps to the right. The various maximum apertures are taken into consideration by the resulting longer or shorter path of movement of plate 11 in the direction of arrow B, prior to its engagement with indicator 5a. Accordingly, the same value of exposure aperture and/or shutter speed is ultimately set in all three cases, e.g., the slide member 20 (FIG. 1) sets the diaphragm value $f/4$ with each of the three lenses. The correct diaphragm value is indicated on the diaphragm scale 6a by the indicator arm 5b.

The invention has been described in detail with particular reference to a preferred embodiment thereof, but it will be understood that variations and modifications can be effected within the spirit and scope of the inven-

We claim:

1. In a camera adapted to receive any of a plurality of interchangeable taking lens assemblies and having a photocell illuminatable by field light, an electric measuring instrument energizable by said photocell as a function of field brightness, said instrument having an indicator positioned as a function of the energization of said instrument, and a scanning member movable into sensing engagement with said indicator for controlling exposure in said camera, means compensating exposure in said camera for the substitution therein of a lens assembly having a first maximum aperture for a lens assembly having a second and different maximum aperture, comprising: means defining a respective surface irregularity on each lens assembly, representing the maximum aperture of the taking lens in that assembly; movable means for sensing said irregularity and positionable in accordance therewith; and a mechanical linkage coupling said scanning member to said sensing means for positioning said scanning member as a function of the maximum aperture of the lens in the lens assembly attached to said camera.

2. The compensating means defined in claim 1, wherein said scanning member comprises a plate having a stepped edge and slidably carried by a support member, said scanning plate and support member being movable together in a first direction for engaging said stepped edge with said indicator, and said plate being slidable relative to said support member by said linkage to adjust the relation of said stepped edge to said indicator in accordance with the maximum aperture of the lens in said attached lens assembly.

3. In a camera adapted to receive any of a plurality of interchangeable taking lens assemblies and having a photocell illuminatable by field light, an electric measuring instrument energizable by said photocell as a function of field brightness, said instrument having an indicator positioned as a function of the energization of said instrument, and a scanning member movable in a first direction in sensing relation to said indicator for controlling exposure in said camera, means compensating exposure in said camera for the substitution therein of a lens assembly having a first maximum aperture for a lens assembly having a second and different maximum aperture, comprising: means defining a respective surface irregularity on each lens assembly, representing the maximum aperture of the taking lens in that assembly; movable means for sensing said irregularity and positionable in accordance therewith; and a mechanical linkage coupling said scanning member to said sensing means for positioning said scanning member, in a direction substantially at right angles to said first direction, as a function of the maximum aperture of the lens in the lens assembly attached to said camera.

References Cited by the Examiner
UNITED STATES PATENTS

| | | | |
|---|---|---|---|
| 3,041,951 | 7/62 | Broschke | 95—10 |
| 3,071,054 | 1/63 | Singer | 95—10 |
| 3,075,442 | 1/63 | Koppen | 95—10 |
| 3,082,672 | 3/63 | Swarofsky | 95—10 |

NORTON ANSHER, *Primary Examiner.*

DELBERT B. LOWE, *Examiner.*